(12) United States Patent
Choi et al.

(10) Patent No.: US 10,429,504 B2
(45) Date of Patent: Oct. 1, 2019

(54) DEVICE FOR PREVENTING VEHICLE ACCIDENT AND METHOD FOR OPERATING SAME

(71) Applicant: LG ELECTRONICS INC., Seoul (KR)

(72) Inventors: Kyungdong Choi, Seoul (KR); Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/555,353

(22) PCT Filed: Apr. 3, 2015

(86) PCT No.: PCT/KR2015/003393
§ 371 (c)(1),
(2) Date: Sep. 1, 2017

(87) PCT Pub. No.: WO2016/140394
PCT Pub. Date: Sep. 9, 2016

(65) Prior Publication Data
US 2018/0038953 A1    Feb. 8, 2018

(30) Foreign Application Priority Data
Mar. 4, 2015    (KR) .................. 10-2015-0030620

(51) Int. Cl.
*G01S 7/00*    (2006.01)
*G08G 1/16*    (2006.01)
(Continued)

(52) U.S. Cl.
CPC ............ *G01S 13/931* (2013.01); *B60R 21/00* (2013.01); *B60R 21/0134* (2013.01); *B60W 50/14* (2013.01); *G01S 7/003* (2013.01); *G08G 1/096791* (2013.01); *G08G 1/162* (2013.01); *G08G 1/166* (2013.01);
(Continued)

(58) Field of Classification Search
CPC ............ G01S 13/931; G01S 2013/936; B60R 21/0134; B60W 50/14; B60W 2550/408; G08G 1/096791; G08G 1/162; G08G 1/166
See application file for complete search history.

(56) References Cited

U.S. PATENT DOCUMENTS

2004/0215373 A1* 10/2004 Won .................. G08G 1/161
                                                                 701/1
2007/0164896 A1    7/2007 Suzuki et al.
(Continued)

FOREIGN PATENT DOCUMENTS

EP    1 785 744 A1    5/2007
JP    2005-238992 A    9/2005
(Continued)

*Primary Examiner* — Aaron L Troost
(74) *Attorney, Agent, or Firm* — Birch, Stewart, Kolasch & Birch, LLP

(57) ABSTRACT

A vehicle including a radar module configured to receive emergency situation notification information indicating a deteriorating weather condition and an accident occurrence state from a front vehicle positioned ahead, and to transmit the emergency situation notification information to a rear vehicle positioned behind.

14 Claims, 16 Drawing Sheets

(51) Int. Cl.
*B60R 21/00* (2006.01)
*B60W 50/14* (2012.01)
*G01S 13/93* (2006.01)
*G01S 17/93* (2006.01)
*G08G 1/0967* (2006.01)
*B60R 21/0134* (2006.01)

(52) U.S. Cl.
CPC ...... *B60W 2550/408* (2013.01); *G01S 17/936* (2013.01); *G01S 2013/936* (2013.01); *G01S 2013/9367* (2013.01)

(56) References Cited

U.S. PATENT DOCUMENTS

| | | | |
|---|---|---|---|
| 2010/0076670 | A1 | 3/2010 | Turner et al. |
| 2011/0034201 | A1 | 2/2011 | Hamada et al. |
| 2013/0154853 | A1* | 6/2013 | Chen ................ G08G 1/096716 340/905 |
| 2014/0063064 | A1* | 3/2014 | Seo ........................ G08G 1/166 345/633 |
| 2015/0156662 | A1* | 6/2015 | Bai ....................... H04W 4/027 370/231 |
| 2015/0348412 | A1* | 12/2015 | Onishi ............. G08G 1/096791 340/905 |

FOREIGN PATENT DOCUMENTS

| | | |
|---|---|---|
| KR | 10-0498965 B1 | 7/2005 |
| KR | 10-0961932 B1 | 6/2010 |
| KR | 10-1387594 B1 | 4/2014 |
| KR | 10-2014-0120087 A | 10/2014 |

\* cited by examiner

FIG. 6

| TRANSMISSION SUBJECT IDENTIFIER FIELD(510) | ACCIDENT OCCURRENCE STATE FIELD(520) | DETERIORATING WEATHER STATE FIELD(530) | VEHICLE LOCATION FIELD(540) | BLACK BOX IMAGE FIELD(550) | VEHICLE OPERATION CONTROL FIELD(560) |
|---|---|---|---|---|---|
| 0 | 0x | 00x<br>TEMPERATURE : -10°C<br>HUMIDITY : 63% | LATITUDE: 38.5834N<br>LONGITUDE: 127.0274E<br>ALTITUDE:<br>5 m above sea level | Black box image | Decelerate velocity to less than 40 km/h |

| TRANSMISSION SUBJECT IDENTIFIER FIELD(610) | ACCIDENT OCCURRENCE STATE FIELD(620) | DETERIORATING WEATHER STATE FIELD(630) | VEHICLE LOCATION FIELD(640) | BLACK BOX IMAGE FIELD(650) | VEHICLE OPERATION CONTROL FIELD(660) |
|---|---|---|---|---|---|
| 1 | Ox<br>Oy | OOx<br>TEMPERATURE : -10°C<br>HUMIDITY : 63% | LATITUDE: 38.5834N<br>LONGITUDE: 127.0274E<br>ALTITUDE:<br>5 m above sea level | Black box image | Decelerate velocity to less than 40 km/h |

600

DEVICE FOR PREVENTING VEHICLE ACCIDENT AND METHOD FOR OPERATING SAME

CROSS REFERENCE TO RELATED APPLICATIONS

This application is the National Phase of PCT International Application No. PCT/KR2015/003393, filed on Apr. 3, 2015, which claims priority under 35 U.S.C. 119(a) to Patent Application No. 10-2015-0030620, filed in Republic of Korea on Mar. 4, 2015, all of which are hereby expressly incorporated by reference into the present application.

TECHNICAL FIELD

The present invention relates a device for preventing a vehicle accident and a method for operating the same.

BACKGROUND ART

Generally, when a vehicle accident occurs on the road, the accident vehicle is left standing on the road for a certain period. As a result, major accidents such as personal injury due to chain collision with the accident vehicles, a guide rail, or other vehicles by other vehicles running in the rear side, resulting from trying to avoid the accident vehicle, are often occurring.

It is difficult for the driver of the vehicle running in the rear to quickly recognize the occurrence of an accident ahead and urgently cope with the accident due to a long braking distance in the snow or rain, a short visibility by bridges or in the fog or mist, and high-speed running on the highway.

Of course, in the case of an accident vehicle, it is necessary to deal with an accident such as quick movement of an accident vehicle in addition to a relief measure for an injured person. In addition, in order to prevent major accidents caused by the chain collision, it is necessary to promptly notify the occurrence of the accident ahead to following vehicles from a long distance behind the accident point so as to be able to cope with the accident safely.

In the event of vehicle accidents, the driver of the accident vehicle installs a tripod on the rear side, makes a signal, or operates the emergency warning of the vehicle, thereby only notifying the occurrence of the accident ahead to the following vehicles. However, this does not help to prevent the occurrence of the chain collision accident.

That is, according to the related art, there is a limit to precisely transmit and warn the drivers of the following vehicles in the rear of the point at which the deteriorating weather condition occurs or in the rear of the accident vehicle to recognize the emergency situation ahead, and there is also a problem that the drivers of the following vehicles do not quickly and urgently cope with the emergency situation ahead.

SUMMARY OF THE INVENTION

An object of the present invention is to previously prevent a traffic accident in a weather-worsening area and prevent a chain collision accident of a following vehicle after a primary accident.

A vehicle according to an embodiment of the present invention includes: a radar module configured to receive emergency situation notification information indicating a deteriorating weather condition and an accident occurrence state from a front vehicle positioned ahead; an output unit configured to output the received emergency situation notification information; and a controller configured to control the radar module to transmit the emergency situation notification information including additional information, which is obtained through the radar module, to a rear vehicle positioned behind.

A vehicle according to another embodiment of the present invention includes: a radar module configured to transmit emergency situation notification information to a rear vehicle when at least one of a deteriorating weather condition and an accident occurrence state is sensed; an output unit configured to output the emergency situation notification information; and a controller configured to obtain traffic-related information, sense the deteriorating weather condition or the accident occurrence state based on the obtained traffic-related information, and control the operation of the vehicle according to the sensing result.

A mobile terminal according to an embodiment of the present invention includes: a wireless communication unit configured to receive traffic-related information from a vehicle; an output unit configured to output emergency situation notification information generated when at least one of a deteriorating weather condition and an accident occurrence state is sensed, based on the received traffic-related information; and a controller configured to control the wireless communication unit such that, when the mobile terminal is disposed inside the vehicle, a power mode of a short-range communication module provided in the mobile terminal is changed from a low power mode to a general power mode, and the emergency situation notification information is transmitted to a mobile terminal disposed inside a rear vehicle.

ADVANTAGEOUS EFFECTS

According to various embodiments of the present invention, when the vehicle is in operation, the deteriorating weather condition or the road deterioration condition may be sensed in advance, and thus, the operation of the vehicle may be controlled according to the sensing result to prevent the traffic accident in advance.

Also, according to various embodiments of the present invention, the emergency situation notification information may be received from the accident vehicle, and the received information may be transmitted to other vehicles to prevent the chain collision accident in advance.

BRIEF DESCRIPTION OF THE DRAWINGS

FIG. 6 is a view for explaining a data frame structure of emergency situation notification information according to an embodiment of the present invention.

FIGS. 13 and 14 are views for explaining a process of allowing a second vehicle to transmit emergency situation notification information and additional information to a following third vehicle and a data frame of the information according to an embodiment of the present invention.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A mobile terminal described in this specification may include mobile phones, smart phone, notebook computers, terminals for digital broadcasting, personal digital assistants (PDAs), portable multimedia players (PMPs), navigators, slate PCs, tablet PCs, ultrabooks, wearable devices (for example, smart watches, smart glasses, and head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
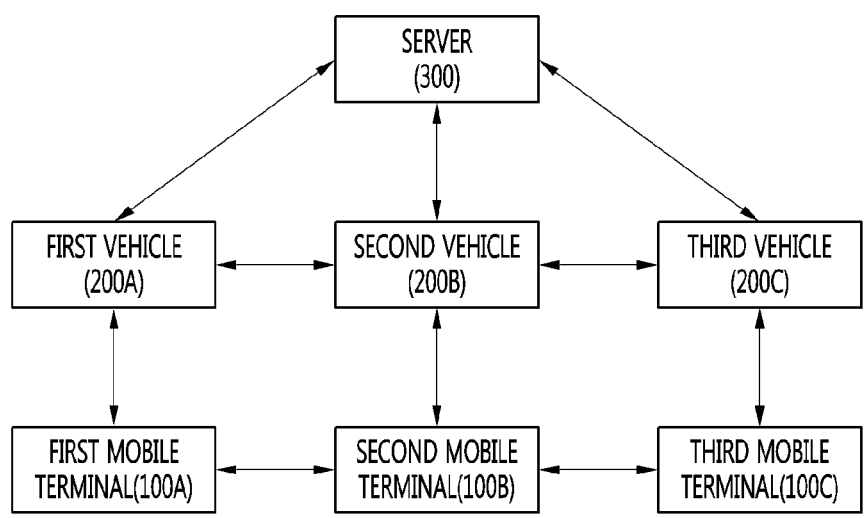
FIG. 1 is view for explaining a configuration of a vehicle accident prevention system according to an embodiment of the present invention.

FIG. 1 is view for explaining a configuration of a vehicle accident prevention system according to an embodiment of the present invention.

Referring to FIG. 1, a vehicle accident prevention system 1 may include a plurality of mobile terminals 100A, 100B, and 100C, a plurality of vehicles 200A, 200B, and 200C, and a server 300.

The first mobile terminal 100A may be disposed within the first vehicle 200A and paired with the first vehicle 200A through short-range wireless communication, the second mobile terminal 100B may be disposed within the second vehicle 200B and paired with the second vehicle 200B through short-range wireless communication, and the third mobile terminal 100C may be disposed within the third vehicle 200C and paired with the third vehicle 200C through short-range wireless communication.

The vehicle paired with each of the mobile terminals may exchange information with each other through the short-range wireless communication standard.

The vehicles may exchange information with each other by using at least one of the vehicle-to-vehicle (V2V) communication or the short-range wireless communication. In this case, the vehicles may be disposed within a predetermined range. However, a module, to which the V2V communication is not supported, may not be provided in a portion of the vehicles. Hereinafter, the vehicle, to which the V2V communication is not supplied, is called a general vehicle, and the vehicle, to which the V2V communication is supported, is called a smart vehicle.

The V2V communication may be performed through a short-range communication module provided in each of the vehicles. The short-range communication module may be one of a Bluetooth module, a Wi-Fi module, and a radar module, but is not limited thereto.

The mobile terminals may exchange information with each other by using the short-range communication module or a wireless Internet module, which will be described later.

The server 300 may remotely provide location information of each of the vehicles, traffic conditions at a point at which each vehicle is located at present, and traffic information indicating road conditions to each vehicle or mobile terminal. The server 300 may provide location information and traffic information to the vehicles through vehicle to infrastructure (V2I) communication.

The server 300 may be called a base state.

The system 1 may further include a GPS satellite that provides location information of the vehicles.

Next, the description will be made with reference to FIG. 2.

Figure 2:
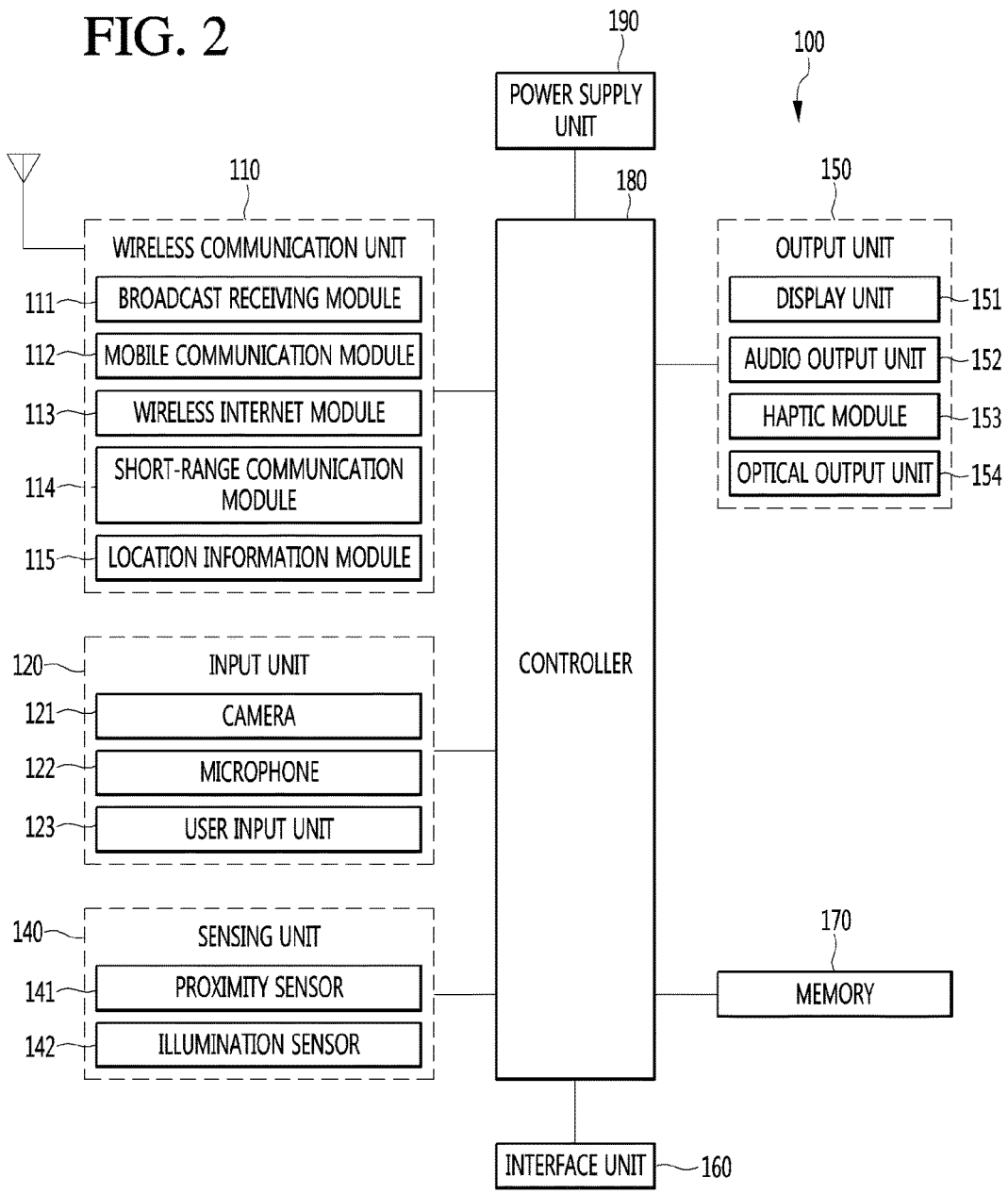
FIG. 2 is a block diagram for explaining a mobile terminal according to an embodiment.

FIG. 2 is a block diagram for explaining a mobile terminal according to an embodiment.

The mobile terminal 100 may include a wireless communication unit 110, an input unit 120, a sensing unit 140, an output unit 150, an interface unit 160, a memory 170, a controller 180, and a power supply unit 190. It is understood that implementing all of the components illustrated in FIG. 1 is not a requirement for the mobile terminal, and that greater or fewer components may alternatively be implemented for the mobile terminal.

In more detail, the wireless communication unit 110 includes one or more modules which permit wireless communication between the mobile terminal 100 and a wireless communication system, between the mobile terminal 100 and another mobile terminal, or between the mobile terminal 100 and an external server. Also, the wireless communication unit 110 may include at least one module connecting the mobile terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for inputting an image signal, a microphone 122 or an audio input unit for inputting an audio signal, and a user input unit 123 (for example, a touch key and a mechanical key) for receiving information from a user. Voice data or image data collected in the input unit 120 may be analyzed and then processed as a control command of the user.

The sensing unit 140 may include at least one sensor configured to sense at least one of information within the mobile terminal 100 and surrounding environment information surrounding the mobile terminal 100. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (for example, the camera (see reference numeral 121)), a microphone (see reference numeral 122), a battery gauge, an environment sensor (for example, a barometer, a hygrometer, a thermometer, a radioactive detection sensor, a thermal detection sensor, a gas detection sensor, and the like), and a chemical sensor (for example, an E-nose, a health care sensor, a biometrics sensor, and the like). The mobile terminal disclosed in this specification may utilize information generated by combining pieces of information that are sensed by at least two sensors of the above-described sensors.

The output unit 150 may generate a visual, auditory, or haptic output. The output unit 150 may include at least one of a display unit 151, an audio output unit 152, a haptic module 153, and an optical output unit 154. The display unit 151 may form an inter-layered structure together with a touch sensor or be integrated with the touch sensor to implement a touch screen. The touch screen may serve as a user input unit 123 that provides an input interface between the mobile terminal 100 and the user and also provide an output interface between the mobile terminal 100 and the user.

The interface unit 160 may serve as an interface with various kinds of external devices connected to the mobile terminal 100. The interface unit 160 may include at least one of a wired/wireless headset, an external charger port, a wired/wireless data port, a memory card port, a port for connecting a device including an identification module, an audio input/output (I/O) port, a video I/O port, and an earphone port. The mobile terminal 100 may perform assorted control functions associated with a connected external device in response to the external device being connected to the interface unit 160.

Also, the memory 170 stores data that supports various functions of the mobile terminal 100. The memory 170 may store a plurality of application programs or applications that are executed in the mobile terminal 100, data or instructions for operating the mobile terminal 100, and the like. At least a portion of the application programs may be downloaded from an external server via wireless communication. Also, at least a portion of application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the above-described components or activating application programs stored in the memory 170.

Also, the controller 180 controls some or all of the components illustrated in FIG. 1 according to the execution of an application program that have been stored in the memory 170. Furthermore, the controller 180 may combine and operate at least two components of the mobile terminal 100 to drive the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a portion of the constituents may cooperate with each other to realize the operation, control, or control method of the mobile terminal according to various embodiments that will be described below. Also, the operation, control, or control method of the mobile terminal 100 may be realized in the mobile terminal 100 by the driving of at least one application program stored in the memory 170.

Hereinafter, the above-described components will be described in more detail with reference to FIG. 1, prior to describe various embodiments implemented through the above-described mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel and a terrestrial channel. At least two broadcast receiving modules 111 may be utilized to facilitate simultaneously receiving of two or more broadcast channels, or to support switching among broadcast channels.

The mobile communication module 112 may transmit and/or receive wireless signals to/from a base station, an external terminal, a server, and the like on a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals include audio call signals, video (telephony) call signals, or various formats of data to support communication of text and multimedia messages.

The wireless Internet module 113 may be a module for wireless Internet access. The wireless Internet module 303 may be embedded in the mobile terminal 100 or installed in an external device. The wireless Internet module 113 may transmit and receiver a wireless signal in a communications network based on wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense (or recognize) the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be obtained using a signal sent from a GPS satellite. As another example, when the mobile terminal uses the Wi-Fi module, a position of the mobile terminal may be obtained based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 may be a module used to obtain a position (or the present position) of the mobile terminal and is not be limited to a module that directly calculate or obtains a position of the mobile terminal.

Next, the input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to obtain left and right images for implementing a stereoscopic image.

The microphone 122 may process an external sound signal into electrical data. The audio input may be processed in various manners according to a function being executed in the mobile terminal 100. The microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like to generate a sensing signal. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the touch screen, or convert capacitance occurring at a specific part of the touch screen, into electric input signals. The touch sensor may also be configured to sense not only a touched position and a touched area, but also touch pressure and/or touch capacitance. Here, a touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen (or a touch key provided in addition to the touch screen). Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

In the components of the input unit 120, the camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. That is, the photo sensor may calculate the coordinates of the physical object according to variation of light to thus obtain location information of the physical object.

The display unit 151 is configured to display (output) information that is processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152 is generally configured to output audio data received from the wireless communication unit 110 or may have been stored in the memory 170 in a signal reception mode, a call mode, a record mode, a voice recognition mode, a broadcast reception mode, and the like. The audio output unit 152 may provide audible output related to a particular function (e.g., a call signal reception sound, a message reception sound, etc.) performed by the mobile terminal 100. The audio output unit 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output unit 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output unit 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various pieces of information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the mobile terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal 100 is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal (100) may operate in relation to a web storage, which performs the storage functions of the memory (160) on the Internet.

The controller 180 may generally control the overall operation of the mobile terminal 100 in addition to the operation related to the application programs. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

Hereinafter, for convenience of description, the description will be limited to CDMA. However, the present disclosure may be applied to all communication systems including a CDMA wireless communication system as well as OFDM (Orthogonal Frequency Division Multiplexing) wireless communication system.

The CDMA wireless communication system generally includes one or more mobile terminals (MT or User Equipment, UE) 100, one or more base stations (BSs, Node B, or evolved Node B), one or more base station controllers (BSCs), and a mobile switching center (MSC). The MSC is configured to interface with a conventional Public Switched Telephone Network (PSTN) and the BSCs. The BSCs may be coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs may be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

In addition, global positioning system (GPS) satellites for locating the position of the mobile terminal 100, for example, may cooperate with the CDMA wireless communication system. The satellites 300 may help to grasp a position of the mobile terminal 100. Useful location information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may obtain an accurate time together with three-dimensional velocity information as well as the location of the latitude, longitude and altitude values from the location information received from the satellites. Furthermore, the GPS module can obtain velocity information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. The contained information and the received wireless AP information may be compared with each other to extract (or analyze) location information of the mobile terminal 100.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly obtained. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can obtain location information by being connected to at least one wireless AP. The number of wireless APs required to obtain location information of the mobile terminal 100 may be variously changed according to a wireless communication environment within which the mobile terminal 100 is positioned.

The description will be made again with reference to FIG. 3.

Figure 3:
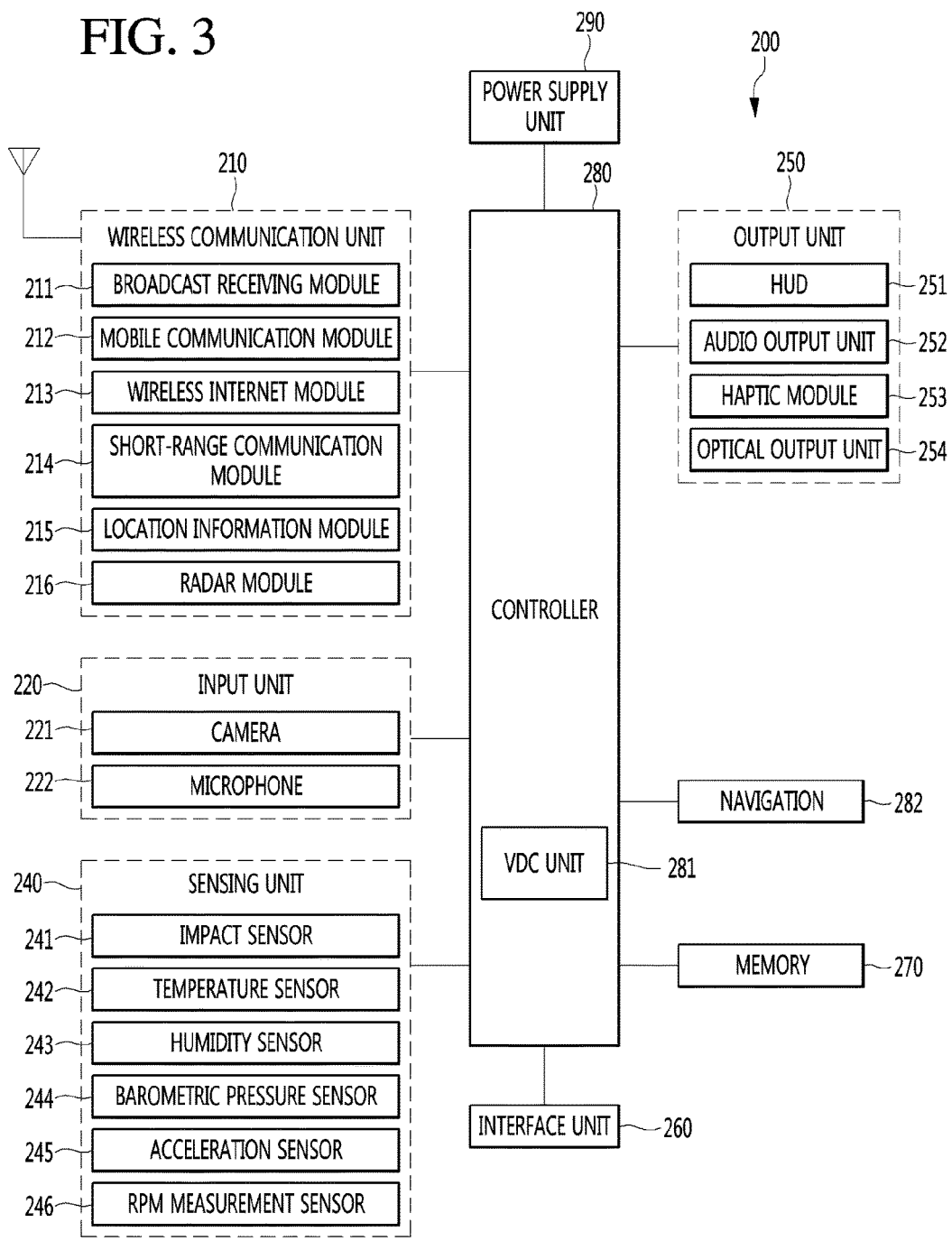
FIG. 3 is a block diagram for explaining a configuration of a vehicle according to an embodiment of the present invention.

FIG. 3 is a block diagram for explaining a configuration of a vehicle according to an embodiment of the present invention.

Referring to FIG. 3, a vehicle 200 may include a wireless communication unit 210, an input unit 220, a sensing unit 240, an output unit 250, an interface unit 260, a memory 270, a controller 280, and a power supply unit 290. Basically, components constituting the vehicle 200 may perform the same function as those of the mobile terminal of FIG. 2.

Hereinafter, components different from those of the mobile terminal 100 and additional components will be mainly described in order to avoid duplicated descriptions.

The wireless communication unit 210 of the vehicle may further include a radar module 216. The radar module 216 may obtain information around a front, a rear, and sides of the vehicle 200 by using millimeter waves to transmit the information to a vehicle 200 disposed at the rear side. The vehicles equipped with the radar module 216 may exchange information through the radar module 216.

The radar module 216 may include one or more of a millimeter wave radar, a sub-millimeter wave radar, and an infrared laser radar.

The millimeter wave radar is capable of measuring a distance of about 100 m to about 200 m, radiating radio waves therearound, receiving and analyzing the reflected waves, and measuring a distance, a direction, and a size of an object. A millimeter wave is used as a radiated wave, has a wavelength of about 1 mm to about 10 mm, and has a frequency band of about 30 GHz to about 300 GHz.

The sub-millimeter wave radar uses a sub-millimeter wave that is measurable at a distance of about 50 m, has a wavelength shorter by about 1/10 than that of the millimeter wave, and has an intermediate characteristic between the millimeter wave and the infrared laser.

The infrared laser radar obtains surrounding environment information by using an infrared laser that is capable of measuring a distance of about 20 m and having a wavelength (about 760 mm) much shorter than the millimeter. Since the infrared laser radar uses the infrared laser having a short wavelength, the distance measurement accuracy is high, but the measurable distance may be short. The radar module 216 may measure a distance between the vehicle 200 and the object by using one of the following schemes. A pulse scheme is a scheme of measuring a transmission delay time of a pulse signal. A frequency modulated continuous wave (FMCW) is a scheme of measuring a distance by continuously radiating a frequency-modulated signal. A multi-frequency continuous wave scheme is a scheme of measuring a distance by using two or more frequencies using an unmodulated continuous wave. A spectrum spreading scheme is a scheme of measuring a distance by using a spreading-modulated radio wave in the same way as a CDMA method of the cellular phone.

The radar module 216 may determine a direction in which an object is located with respect to the vehicle 200 by using one of the following schemes. A Mecha scan scheme is a scheme of changing a direction of the antenna through a mechanical unit to grasp the direction. An electronic scan scheme is a scheme of calculating an output of several antenna elements such as an array antenna to grasp a direction. A phase monopulse scheme is a scheme in which two or more antennas are arranged side by side to detect a direction by a phase difference of a received signal. An amplitude monopulse scheme is a scheme in which a beam direction is shifted to receive signals with two antennas and detect the direction by using a difference in amplitude.

The controller 280 of the vehicle 200 may control the operation of the vehicle 200 by using the obtained information about the surrounding environment. The information about the surrounding environment may include traffic-related information to be described later. The control of the operation of the vehicle 200 through the radar module 216 will be described later.

An impact sensor 241 of the sensing unit 240 of the vehicle 200 is a sensor for measuring an amount of impact applied to the vehicle. The impact sensor 241 may be provided in a front bumper or a rear bumper of the vehicle 200, but is not limited thereto. The impact sensor 241 may be provided at any surface of the vehicle 200. A temperature sensor 242 is a sensor for measuring a temperature at a position where the vehicle is located. A humidity sensor 243 is a sensor for measuring a humidity at a position where the vehicle is located. The measured humidity may be used to determine the degree of fog at a position where the vehicle is located. A barometric pressure sensor 244 is a sensor for measuring a barometric pressure at a position where the vehicle is located. The measured barometric pressure may be used to determine altitude above sea level at a position where the vehicle is located. An acceleration sensor 245 is a sensor for measuring an acceleration of the vehicle. The measured acceleration may be used to determine whether the vehicle suddenly stopped or not. An RPM measurement sensor 246 may measure the number of revolutions of a wheel provided in the vehicle.

The output unit 250 of the vehicle 200 may include a head up display (HUD) 251. The HUD 251 may be disposed on a front windshield of the vehicle and may include a transparent film or a reflective lens. The HUD 251 may guide a driver to drive a vehicle safely by projecting, on the transparent film or the reflective lens, emergency situation notification information received from another vehicle or a mobile terminal of another vehicle.

The vehicle 200 may include a vehicle dynamic control (VDC) unit 281. The VDC unit 281 is a safety device that prevents skidding on a wet road or an icy road by automatically controls engine output or individually controlling wheels at the event of emergency situation.

The vehicle 200 may include a navigation 282. The navigation 282 is a vehicle navigation device that provides a current position of a vehicle and a neighboring map to a driver. The navigation 282 may output emergency situation notification information received from another vehicle or a mobile terminal of another vehicle.

Next, the method for operating the vehicle accident prevention system according to an embodiment of the present disclosure will be described with reference to FIG. 4.

Figure 4:
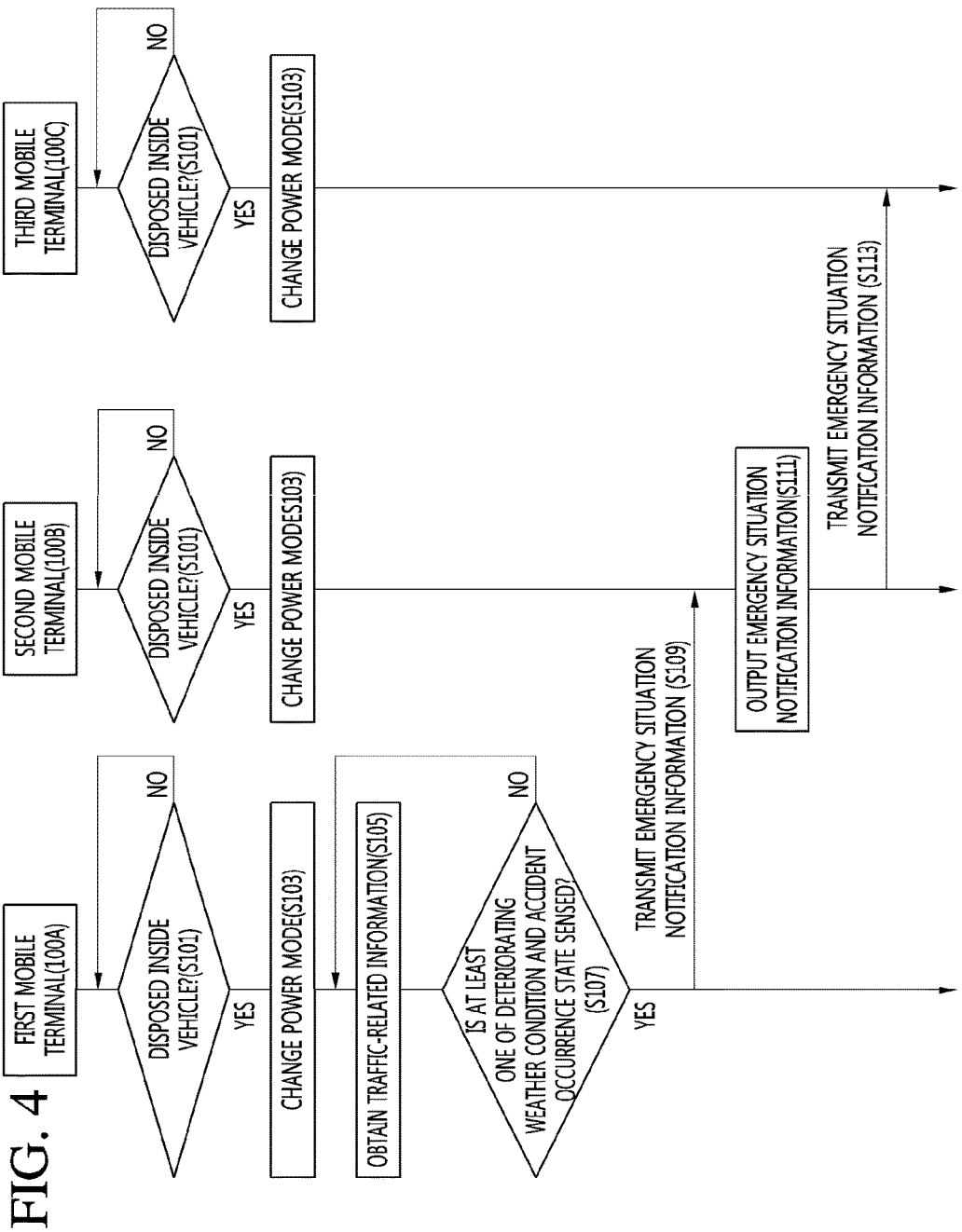
FIG. 4 is a ladder diagram for explaining a method for operating a vehicle accident prevention system according to another embodiment of the present invention.

FIG. 4 is a ladder diagram for explaining a method for operating a vehicle accident prevention system according to another embodiment of the present invention.

In FIG. 4, it is assumed that the first vehicle 200A does not support a V2V communication.

First, the controller 180 of the first mobile terminal 100A checks whether the first mobile terminal 100A is disposed within the vehicle (S101).

In an embodiment, the controller 180 of the first mobile terminal 100A may perform wireless short-range communication with the wireless communication unit 210 provided in the vehicle 200 through the short-range communication module 114. When the first mobile terminal 100A is disposed within the vehicle 200A, the controller 180 may attempt to pair with the wireless communication unit 210 provided in the first vehicle 200A, and when paired, the controller 180 may determine that the first mobile terminal 100A is disposed within the first vehicle 200A.

In another embodiment, when the first mobile terminal 100A is connected to a charger provided in the first vehicle 200A and receives power from a power supply unit provided in the first vehicle 200A, the controller 180 may determine that the first mobile terminal 100A is disposed within the first vehicle 200A.

When the first mobile terminal 100A is located within the vehicle, the controller 180 of the first mobile terminal 100A changes a power mode of the short-range communication module 114 from a low power mode to a normal power mode in order for efficient information transmission (S103). Each of the mobile terminals may include the short-range communication module 114. The short-range communication module 114 is provided for short-range communication and may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and the wireless communication system, between the mobile terminal 100 and another mobile terminal 100, or between networks where the mobile terminal 100 and another mobile terminal 100 (or an external server) are disposed, through wireless area networks.

In an embodiment, when the short-range communication module 114 performs communication by using the Bluetooth™ standard, the short-range communication module 114 may include a Bluetooth module. The power mode of the Bluetooth module may include a low power mode and a normal power mode. The low power mode may be a mode that operates by using a Bluetooth Low Energy (BLE) technology corresponding to the Bluetooth™ standard 4.0. The normal power mode may be a mode that operates by using an existing Bluetooth standard other than Bluetooth™ standard 4.0. In the low power mode, the Bluetooth module reduces an operating cycle of the Bluetooth module, as compared with a normal power mode. Thus, the Bluetooth module may be sleep for a longer time and may be less frequently activated. Additionally, in the low power mode, the Bluetooth module may reduce a packet size and the number of channels and may simplify a procedure for connection to another device.

When the first mobile terminal 100A is disposed within the vehicle, the controller 180 may change the power mode of the Bluetooth module from the low power mode to the normal power mode so that a deteriorating weather condition or an accident occurrence state can be promptly transmitted to the second mobile terminal 100B.

Operations S101 and S103 may also be applied to the second mobile terminal 100B and the third mobile terminal 100C. In this case, the second mobile terminal 100B may be disposed in a vehicle that follows a vehicle at which the first mobile terminal 100A is disposed, and the third mobile terminal 100C may be disposed in a vehicle that follows a vehicle at which the second mobile terminal 100B is disposed.

The controller 180 of the first mobile terminal 100A obtains traffic-related information after changing the power mode of the short-range communication module 114 to the normal power mode (S105).

In an embodiment, the traffic-related information may include at least one of weather information at a position where a vehicle is located, black box image information obtained through a camera provided in a vehicle, vehicle information, and road condition information.

The weather information may be information indicating a weather condition at a current position of a vehicle. The weather information may include information about temperature, humidity, barometric pressure, and the like at a position where a vehicle is located.

The black box image information may include an image obtained by capturing a place in front of a vehicle.

The vehicle information may include an amount of impact applied to the vehicle 200, an acceleration of the vehicle 200, a velocity of the vehicle 200, location information of the vehicle 200, and state information of the VDC unit 281 provided in the vehicle 200. The location information of the vehicle 200 may be obtained through a location information module 215 provided in the vehicle 200. The location information of the vehicle 200 may include latitude, longitude, and altitude. The altitude is required so as to distinguish an accident road when overlapped with a high level road such as an elevated road. The altitude may be measured through the barometric pressure sensor provided in the vehicle or the barometric pressure sensor provided in the mobile terminal 100.

The state information of the road may include information about the road surface condition of the road on which the vehicle is running. This will be described later.

The process of acquiring the traffic-related information will be described later.

In an embodiment, the traffic-related information may be received from the vehicle where the first mobile terminal 100A is located. That is, the short-range communication module 114 of the first mobile terminal 100A may obtain traffic-related information obtained by the vehicle from the wireless communication unit provided in the vehicle.

In an embodiment, the controller 180 of the first mobile terminal 100A may transmit the obtained traffic-related information to the short-range communication module 114 of the second mobile terminal 100B through the short-range communication module 114.

The controller 180 of the first mobile terminal 100A senses at least one of the deteriorating weather condition and the accident occurrence state based on the obtained traffic-related information (S107).

In an embodiment, the controller 180 may sense the deteriorating weather condition based on weather information included in the traffic-related information. For example, when the obtained humidity is greater than or equal to a set humidity, the controller 180 may sense that the vehicle is in a deteriorating weather condition at a position where the vehicle is located.

The controller 180 may sense a deteriorating weather condition in which there is a lot of fog or heavy snow falls at a position where the vehicle is located, through the weather information.

In another embodiment, the controller 180 may sense an accident occurrence state based on the vehicle information included in the traffic-related information. For example, when the impact applied to the vehicle is greater than or equal to a preset amount of impact, the controller 180 may sense that the vehicle is in an accident occurrence state. The bumper of the vehicle may be provided with an impact sensor. When the amount of impact measured through the impact sensor is greater than or equal to a predetermined amount of impact, the controller 180 may sense an accident occurrence state indicating that the vehicle is currently in an accident.

In another example, when the acceleration of the vehicle is reduced by a predetermined acceleration or more (when the vehicle suddenly stops), the controller 180 may detect that the vehicle is in an accident occurrence state.

In another embodiment, the controller 180 may sense an accident occurrence state based on the state information of the VDC unit. The VDC unit is a safety device that prevents skidding on a wet road or an icy road by automatically controls engine output or individually controlling wheels at the event of emergency situation. The controller 180 may sense that an accident has occurred when the VDC unit is operated based on the state information of the VDC unit.

In another embodiment, the controller 180 of the first mobile terminal 100A may autonomously sense an accident occurrence state without receiving the traffic-related information from the vehicle. For example, when the acceleration of the vehicle obtained through the acceleration sensor provided in the first mobile terminal 100A is reduced by a predetermined acceleration or more (when the vehicle suddenly stops), the controller 180 may sense that the vehicle is in an accident occurrence state.

When the controller 180 of the first mobile terminal 100A senses at least one of the deteriorating weather condition and the accident occurrence state, the controller 180 transmits the emergency situation notification information to the second mobile terminal 100B (S109).

In an embodiment, when the controller 180 of the first mobile terminal 100A senses at least one of the deteriorating weather condition and the accident occurrence state, the controller 180 may wirelessly transmit the emergency situation notification information to the short-range communication module 114 of the second mobile terminal 100B through the short-range communication module 114 of the first mobile terminal 100A. The emergency situation notification information may be information for notifying the emergency situation to the driver of the following vehicle.

When the controller 180 of the first mobile terminal 100A senses at least one of the deteriorating weather condition and the accident occurrence state, the controller 180 may amplify the strength of power used in information transmission in the normal power mode and transmit the emergency situation notification information to the short-range communication module 114 of the second mobile terminal 100B. That is, the controller 180 of the first mobile terminal 100A may be configured such that the strength of the power used in transmitting the emergency situation notification information may be greater than the strength of the power used in transmitting the information in the normal power mode.

In embodiments of the present invention, only an embodiment in which the emergency situation notification information is transmitted to the second mobile terminal 100B is described, but the embodiments are not limited thereto. When the controller 180 of the first mobile terminal 100A senses at least one of the deteriorating weather condition and the accident occurrence state, the controller 180 may amplify the strength of power used in information transmission in the normal power mode and transmit the emergency situation notification information to mobile terminals located in following vehicles, as well as the second mobile terminal 100B. This is for notifying the emergency situation to the following vehicles by increasing a distance for transmitting the emergency situation notification information.

Accordingly, the emergency situation notification information is quickly and accurately transmitted to other mobile terminals including the second mobile terminal 100B, so that the driver of the vehicle can quickly check the emergency situation occurring ahead.

In another embodiment, the controller 180 of the first mobile terminal 100A may transmit the emergency situation notification information to the following second vehicle 200B through the short-range communication module 114.

The controller 180 of the second mobile terminal 100B outputs the emergency situation notification information received from the first mobile terminal 100A (S111).

In an embodiment, the controller 180 of the second mobile terminal 100B may output the emergency situation notification information received from the first mobile terminal 100A through the output unit 150. For example, the controller 180 of the second mobile terminal 100B may control the haptic module 153 to generate vibration in order to notify the emergency situation according to the received emergency situation notification information. In another example, the controller 180 of the second mobile terminal 100B may control the audio output unit 152 to output a message indicating the emergency situation in the form of voice, so as to notify the received emergency situation. In another example, the controller 180 of the second mobile terminal 100B may control the haptic module 153 and the audio output unit 152 to generate vibration and simultaneously output a message indicating the emergency situation in the form of voice, so as to notify the received emergency situation.

In another embodiment, the controller 180 of the second mobile terminal 100B may transmit the emergency situation notification information to the second vehicle 200B through the short-range communication module 114. The second vehicle 200B can output the emergency situation notification information received from the second mobile terminal 100B through the HUD 251.

The controller 180 of the second mobile terminal 100B transmits the emergency situation notification information received from the first mobile terminal 100A to the third mobile terminal 100C (S113).

In an embodiment, when the controller 180 of the second mobile terminal 100A senses at least one of the deteriorating weather condition and the accident occurrence state, the controller 180 may wirelessly transmit the emergency situation notification information to the short-range communication module 114 of the third mobile terminal 100C through the short-range communication module 114. The third mobile terminal 100C may be disposed in a vehicle following the vehicle where the second mobile terminal 100B is disposed. The driver of the third mobile terminal 100C can easily recognize that an emergency has occurred in the front through the emergency situation notification information received by the third mobile terminal 100C. The third mobile terminal 100C may also transmit the emergency situation notification information received from the second mobile terminal 100B to the mobile terminal 100 disposed in the following vehicle.

Figure 5:
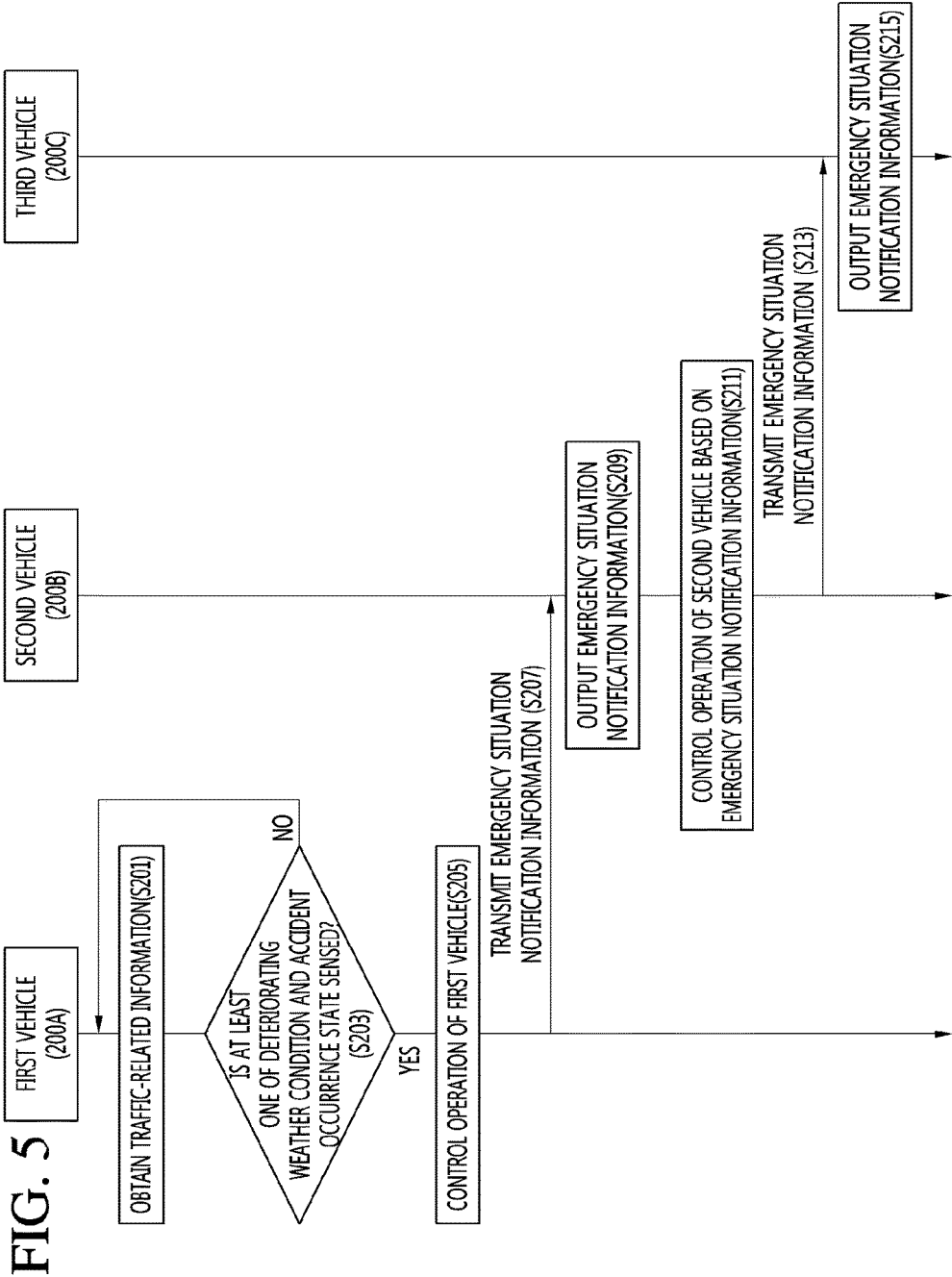
FIG. 5 is a ladder diagram for explaining a method for operating a system according to further another embodiment of the present invention.

Next, FIG. 5 is described.

FIG. 5 is a ladder diagram for explaining a method for operating a vehicle accident prevention system according to further another embodiment of the present invention.

In FIG. 5, it is assumed that each of the first vehicle 200A, the second vehicle 200B, and the third vehicle 200C is provided with the radar module 216 so as to support V2V communication.

The controller 280 of the first vehicle 200A obtains traffic-related information (S201).

In an embodiment, the traffic-related information may include at least one of weather information at a position where a vehicle is located, black box image information obtained through a camera provided in a vehicle, vehicle information, and road condition information of a road on which the vehicle is running.

The weather information may be information indicating a weather condition at a current position of a vehicle. The weather information may include information about temperature, humidity, barometric pressure, and the like at a position where a vehicle is located. The temperature sensor 242 of the first vehicle 200A may measure a temperature at a position where the first vehicle 200A is located. The measured temperature may be transmitted to the controller 280 of the first vehicle 200A and used to determine a weather at a position where the first vehicle 200A is located. The humidity sensor 243 of the first vehicle 200A may measure a humidity at a position where the first vehicle 200A is located. The measured humidity may be transmitted to the controller 280 of the first vehicle 200A and used to check whether the front of the first vehicle 200A is fogged. The barometric pressure sensor 244 of the first vehicle 200A may measure a barometric pressure at a position where the first vehicle 200A is located. The measured barometric pressure may be transmitted to the controller 280 of the first vehicle 200A and used to determine at which altitude the first vehicle 200A is currently located. The first vehicle 200A may further include an illumination sensor, and the illumination measured through the illumination sensor may be used to determine whether the weather is clear or cloudy.

The black box image information may include an image obtained by capturing a place in front of a vehicle. The camera 221 of the first vehicle 200A may photograph the front of the first vehicle 200A and display the photographed image. The controller 280 may use the photographed image to determine information about the weather condition ahead, information about the condition of the road, and the number of vehicles located in the vicinity.

The vehicle information may include an amount of impact applied to the vehicle, an acceleration of the vehicle, a velocity of the vehicle, location information of the vehicle, distance information between vehicles, and state information of the VDC unit 281 provided in the vehicle. The impact sensor 241 of the first vehicle 200A may measure an amount of impact applied to the vehicle. The measured amount of impact may be used to determine whether the accident occurrence state of the first vehicle 200A has been sensed. The impact sensor 241 may be provided in the bumper of the first vehicle 200A, but is not limited thereto. The impact sensor 241 may be provided at any surface of the first vehicle 200A.

The location information of the first vehicle 200A may be obtained through a location information module 115 provided in the first vehicle 200A. In an example, the location information of the vehicle may be obtained through any one of a GPS module, a Wi-Fi module, and a Bluetooth module provided in the vehicle or the mobile terminal. In another example, the location information of the vehicle may be obtained through the radar module.

The location information of the vehicle may include latitude, longitude, and altitude. The altitude is required so as to distinguish an accident road when roads such as elevated roads are overlapped. The altitude may be measured through the barometric pressure sensor 244 provided in the vehicle or the barometric pressure sensor provided in the mobile terminal 100.

The distance information between vehicles may be measured through the radar module 216.

The state information of the road may include information on the road surface condition of the road on which the vehicle is running. The vehicle 200 may include the RPM measurement sensor 246 that measures the number of revolutions of a wheel. The RPM measurement sensor 246 may be one of a magnetic proximity sensor and a revolution per minute (RPM) sensor. The controller 280 of the vehicle 200 may obtain state information of the road surface based on the measured number of revolutions of the wheel and the measured velocity of the vehicle 200. For example, when the number of revolutions per second of the vehicle is less than a preset number of revolutions per second of the vehicle 200, the controller 280 of the vehicle 200 may determine the road surface condition to be an icy state or a wet state. When it is determined that the road surface condition is the icy state or the wet state, the controller 280 may automatically control the velocity of the vehicle 200 or may control the air pressure of the tire. This will be described later.

The function of measuring the number of revolutions of the wheel may be performed through the VDC unit 281.

The state information of the road may further include characteristic information of the road. The controller 280 of the vehicle 200 can grasp characteristics of the road by using the location information of the vehicle 200 received through the location information module 215. The characteristics of the road may be used to determine whether a current road is an expressway or a national road, how many lanes the current road has, the width of the lane, or whether the current road is a straight road or a curved road.

In an embodiment, the controller 280 of the first vehicle 200A may transmit the traffic-related information to the radar module 216 of the second vehicle 200B following the first vehicle 200A through the radar module 216 of the first vehicle 200A.

In another embodiment, when the short-range communication module 214 is a Bluetooth module, each Bluetooth module may operate in a normal power mode. The short-range communication module 214 may change the operating mode from the low power mode to the normal power mode when the vehicle is started.

Although not shown in FIG. 5, each of the second vehicle 200B and the third vehicle 200C may also collect the traffic-related information.

The controller 280 of the first vehicle 200A senses at least one of the deteriorating weather condition and the accident occurrence state based on the obtained traffic-related information (S203).

In an embodiment, the controller 280 may sense the deteriorating weather condition based on at least one of weather information and road condition information included in the traffic-related information. For example, when the obtained humidity is greater than or equal to a set humidity, the controller 180 may sense that the vehicle is in a deteriorating weather condition at a position where the vehicle is located. Additionally, when the number of revolutions per second of the wheel is less than a preset number of revolutions per second of the vehicle 200, the controller 280 of the vehicle 200 may determine the road surface condition to be an icy state and may determine this as sensing the deteriorating weather condition.

In another embodiment, the controller 280 may sense the deteriorating weather condition based on the black box image information. Specifically, the camera 221 of the first vehicle 200A may photograph the front side and may sense the deteriorating weather condition based on the photographed image. The first vehicle 200A may store a heavy snow image at the time of heavy snowfall, a heavy rain image at the time of heavy rain, and the like in the memory 270, and sense the deteriorating weather condition through a matching process between the image of the photographed image and the pre-stored image. The controller 280 may determine that the deteriorating weather condition has occurred when the matching between the photographed image and the pre-stored image is greater than or equal to a preset degree of similarity.

In another embodiment, the controller 180 may sense an accident occurrence state based on the vehicle information included in the traffic-related information. This will be described below with reference to FIG. 4.

When the controller 280 of the first vehicle 200A senses at least one of the deteriorating weather condition and the accident occurrence state, the controller 280 controls the operation of the first vehicle 200A (S205).

In an embodiment, when the controller 280 of the first vehicle 200A senses at least one of the deteriorating weather condition and the accident occurrence state, the controller 280 controls at least one of the velocity of the first vehicle 200A and the air pressure of the tire.

For example, when the controller 280 senses at least one of the deteriorating weather condition and the accident occurrence state, the controller 280 automatically controls the motor or the brake to reduce the velocity of the first vehicle 200A.

In another example, when the controller 280 senses at least one of the deteriorating weather condition and the accident occurrence state, the controller 280 may control the velocity of the first vehicle 200A based on the location information of the first vehicle 200A. For example, when at least one of the deteriorating weather condition and the accident occurrence state is sensed and the first vehicle 200A is on a curved road, the velocity of the first vehicle 200A may be further reduced, as compared with the case where the first vehicle 200A is on a straight road.

In another embodiment, when the controller 280 of the first vehicle 200A senses at least one of the deteriorating weather condition and the accident occurrence state, the controller 280 may reduce the air pressure of the tire. As the air pressure of the tire is reduced, the frictional force between the tire and the road surface is increased, thereby preventing the first vehicle 200A from skidding.

In another embodiment, when the controller 280 of the first vehicle 200A senses at least one of the deteriorating weather condition and the accident occurrence state, the controller 280 may reduce the air pressure of the tire while reducing the velocity of the first vehicle 200A.

At the same time as or after the control of the operation of the first vehicle 200A, the controller 280 of the first vehicle 200A transmits the emergency situation notification information to the second vehicle 200B (S207).

In an embodiment, when the controller 280 of the first vehicle 200A senses at least one of the deteriorating weather condition and the accident occurrence state, the controller 280 may wirelessly transmit the emergency situation notification information to the radar module 216 of the second vehicle 200B through the radar module 216 of the first vehicle 200A. The emergency situation notification information may be information for notifying the emergency situation to the driver of the following vehicle. The emergency situation notification information may be transmitted and received through the short-range communication module provided in each vehicle.

A data frame structure of the emergency situation notification information will be described with reference to FIG. 6.

FIG. 6 is a view for explaining a data frame structure of emergency situation notification information according to an embodiment of the present invention.

Referring to FIG. 6, the data frame 500 of the emergency situation notification information may include at least one of a transmission subject identifier field 510, an accident occurrence state field 520, a deteriorating weather condition field 530, a vehicle location field 540, a black box image field 550, and a vehicle operation control field 560.

The transmission subject identifier field 510 may be a field for identifying the subject of the vehicle that has transmitted the emergency situation notification information. When the value of the transmission subject identifier field 510 is 0, it may indicate a vehicle where an accident occurred for the first time, or may indicate a vehicle that confirmed a deteriorating weather condition for the first time. When the value of the transmission subject identifier field 510 is 1, it may indicate the identification of a vehicle that retransmits the data frame 500 received from the vehicle having the accident. This will be described later.

The accident occurrence state field 520 may be a field indicating whether an accident occurrence state has been sensed. When the value of the accident occurrence state field 520 is 0x, it may indicate that an accident has been sensed in the vehicle. When the value of the accident occurrence state field 520 is 0y, it may indicate that an accident in the vehicle has not been sensed in the vehicle.

The deteriorating weather condition field 530 may be a field including at least one of sensing or non-sensing of the deteriorating weather condition and weather information. When the value of the deteriorating weather condition field 530 is 00x, it may indicate that the deteriorating weather condition has been sensed in front of the vehicle, and when 00y, it may indicate that the deteriorating weather condition is not sensed in front of the vehicle. In addition, the weather information may include a temperature value and a humidity value obtained when the deteriorating weather condition is sensed. The deteriorating weather condition field 530 may include contents of actual deteriorating weather such as dense fog, heavy snowfall, heavy rain, presence of icy roads, and the like. For example, if the icy road is 10 meters, the deteriorating weather condition field 530 may include this.

The vehicle location field 540 may be a field including location information of the vehicle where an accident occurred, when an accident occurrence state is sensed. The vehicle location field 540 may include one or more of the latitude, longitude, altitude, road name, and lane information of the vehicle where an accident occurred.

The black box image field 550 may be a field indicating a black box image at the time when at least one of the deteriorating weather condition or the accident occurrence state is sensed.

The vehicle operation control field 560 may be a field including a command for controlling the operation of the vehicle as at least one of the deteriorating weather condition or the accident occurrence state is sensed. For example, if the state of the weather included in the deteriorating weather condition field 530 is the 10-m icy road, the vehicle operation control field 560 may include a command to decelerate the vehicle velocity to less than 40 km/h. In addition, the vehicle operation control field 560 may further include contents of the operation control of the vehicle described in operation S205. In addition, the vehicle operation control field 560 may also include information for guiding the traveling direction of the vehicle (for example, lane change).

In another embodiment, the data frame 500 of the emergency situation notification information may further include the traffic-related information.

Again, FIG. 5 is described.

According to another embodiment of the present invention, the controller 280 of the first vehicle 200A may change the intensity of the transmission signal including the emergency situation notification information based on the velocity of the first vehicle 200A. For example, when the velocity of the first vehicle 200A is less than 20 km/h, the controller 280 may adjust the intensity of the transmission signal to 1 W (watt). When the velocity of the first vehicle 200A is in a range of 20 to 40 km/h, the controller 280 may adjust the intensity of the transmission signal to 2 W. When the velocity of the first vehicle 200A is in a range of 40 to 60 km/h, the controller 280 may adjust the intensity of the transmission signal to 3 W. When the velocity of the first vehicle 200A is 60 km/h or more, the controller 280 may adjust the intensity of the transmission signal to 4 W. That is, as the velocity of the first vehicle 200A increases, the controller 280 may adjust the intensity of the transmission signal to be greater so as to indicate that the situation is more urgent. Accordingly, the first vehicle 200A can transmit the emergency situation notification information to the following vehicles as well as the second vehicle 200B and the third vehicle 200C, so that the drivers of the following vehicles can confirm the emergency situation and cope with the emergency situation in advance.

In another embodiment, the controller 280 of the first vehicle 200A may control the radar module 216 to transmit the transmission signal including the emergency situation notification information to the neighboring vehicle at the maximum intensity.

In another embodiment, the controller 280 of the first vehicle 200A may change the intensity of the transmission signal including the emergency situation notification information based on the distance between the first vehicle 200A and the second vehicle 200B. For example, when the distance is longer than a reference distance, the controller 280 may increase the intensity of the transmission signal, and when the distance is less than the reference distance, the controller 280 may reduce the intensity of the transmission signal.

Meanwhile, when the controller 280 of the first vehicle 200A does not sense the deteriorating weather condition and the accident occurrence state, the controller 280 may adjust the intensity of the transmission signal based on the distance to the following second vehicle 200B. For example, when the distance between the first vehicle 200A and the second vehicle 200B is longer than the reference distance, the controller 280 can increase the intensity of the transmission signal, and when the distance between the first vehicle 200A and the second vehicle 200B is shorter than the reference distance, the controller 280 may reduce the intensity of the transmission signal.

Changing the intensity of the transmission signal may be applied to between the second vehicle 200B and the third vehicle 200C.

The controller 280 of the second vehicle 200B outputs the emergency situation notification information received from the first vehicle 200A (S209).

In an embodiment, the controller 280 of the second vehicle 2003 outputs the emergency situation notification information through the HUD 251 provided in the front windshield of the second vehicle 200B.

In another embodiment, the controller 280 of the second vehicle 200B may control the audio output unit 252 or the haptic module 253 to notify the emergency situation based on the received emergency situation notification information.

Operation S207 will be described with reference to FIGS. 7 to 12.

FIGS. 7 to 12 are views for explaining an example in which emergency situation notification information is output according to various embodiments of the present invention.

Figure 7:
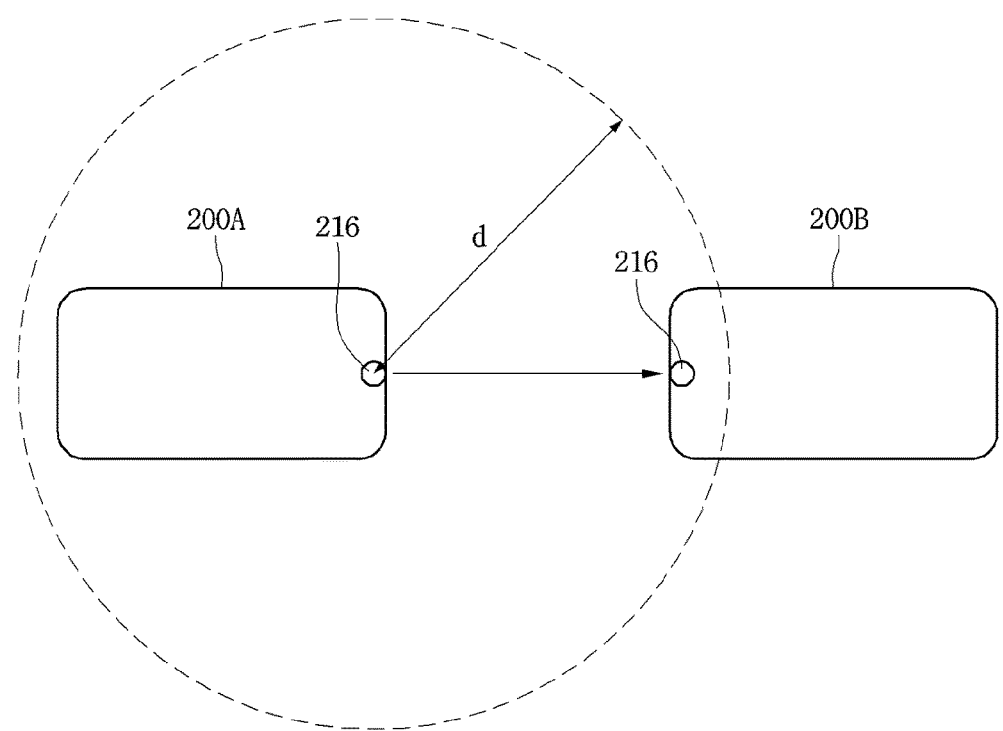
FIGS. 7 to 12 are views for explaining an example in which emergency situation notification information is output according to various embodiments of the present invention.

Referring to FIG. 7, the short-range communication module 214 of the first vehicle 200A may transmit the emergency situation notification information to the short-range communication module 214 of the second vehicle 200B. Here, the short-range communication module 214 may be any one of a Bluetooth module, a Wi-Fi module, and a radar module, but is not limited thereto. The short-range communication module 214 of the first vehicle 200A may transmit the emergency situation notification information to the short-range communication module 214 of the second vehicle 200B located within a predetermined distance d.

In another embodiment, an infrared sensor may be used to transmit and receive the emergency situation notification information. The infrared sensor may be a sensor for transmitting the emergency situation notification information by using infrared rays (laser) having a single wavelength. Since the infrared rays having a single wavelength have straightness, the infrared rays are not visible to a general pedestrian, but may be displayed visually through the HUD 251 provided in the following vehicle.

Figure 8:
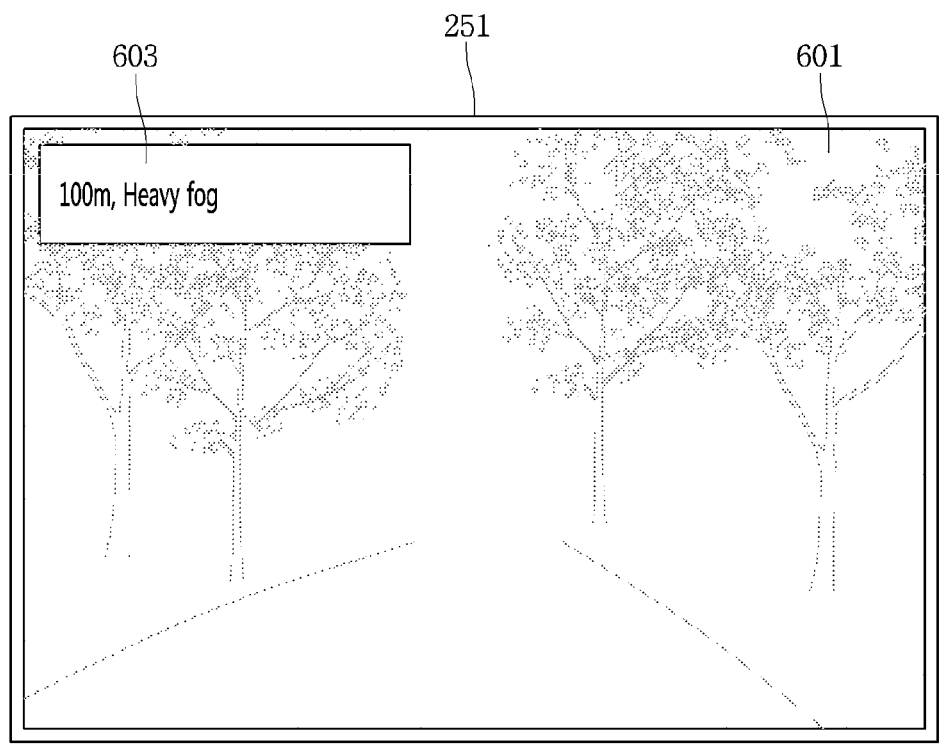

FIG. 8 shows an image 601 displayed on the HUD 251 provided in the front windshield of the second vehicle 200B.

The image 601 displayed on the HUD 251 of the second vehicle 200B may be an image generated based on the emergency situation notification information received from the first vehicle 200A. In an embodiment, the image 601 displayed on the HUD 251 of the second vehicle 200B may be a black box image included in the emergency situation notification information of the first vehicle 200A. In another embodiment, the image 601 displayed on the HUD 251 of the second vehicle 200B may be a laser show indicating a situation of heavy fog.

A weather condition explanation window 603 generated based on the emergency situation notification information may be further displayed on the HUD 251 to indicate that it is a heavy fog 100 m ahead of the second vehicle 200B.

Figure 9:
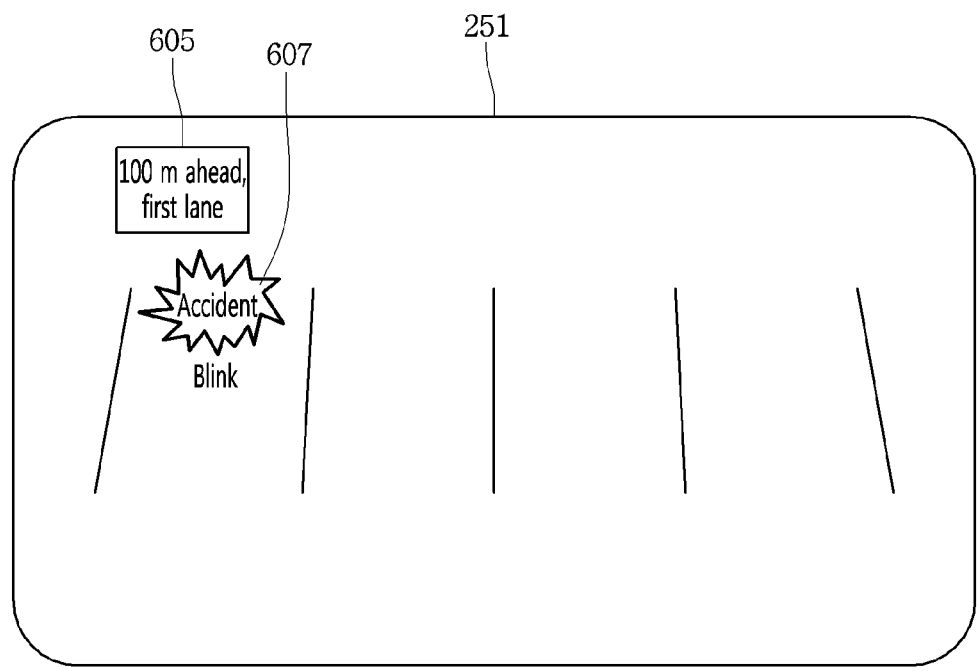

Next, FIG. 9 is described.

Referring to FIG. 9, the HUD 251 of the second vehicle 200B may display information about an accident occurrence state, based on the received emergency situation notification information. That is, the controller 280 of the second vehicle 200B may control the HUD 251 to display an accident occurrence spot 605 and an accident occurrence indicator 607 indicating an accident occurrence, based on the emergency situation notification information received from the first vehicle 200A. The accident occurrence spot 605 may include information about a distance from a current location of the second vehicle 200B to the accident occurrence spot and a lane where the accident occurred. The accident occurrence indicator 607 is an indicator for visually informing the driver that an accident has occurred at the accident occurrence spot. The accident occurrence indicator 607 may be blinked so that the driver can easily recognize the accident occurrence situation.

The driver of the second vehicle 200B can easily recognize that an accident has occurred in the lane on which the driver of the second vehicle 200B is driven through the HUD 251 and can quickly take measures accordingly.

Figure 10:
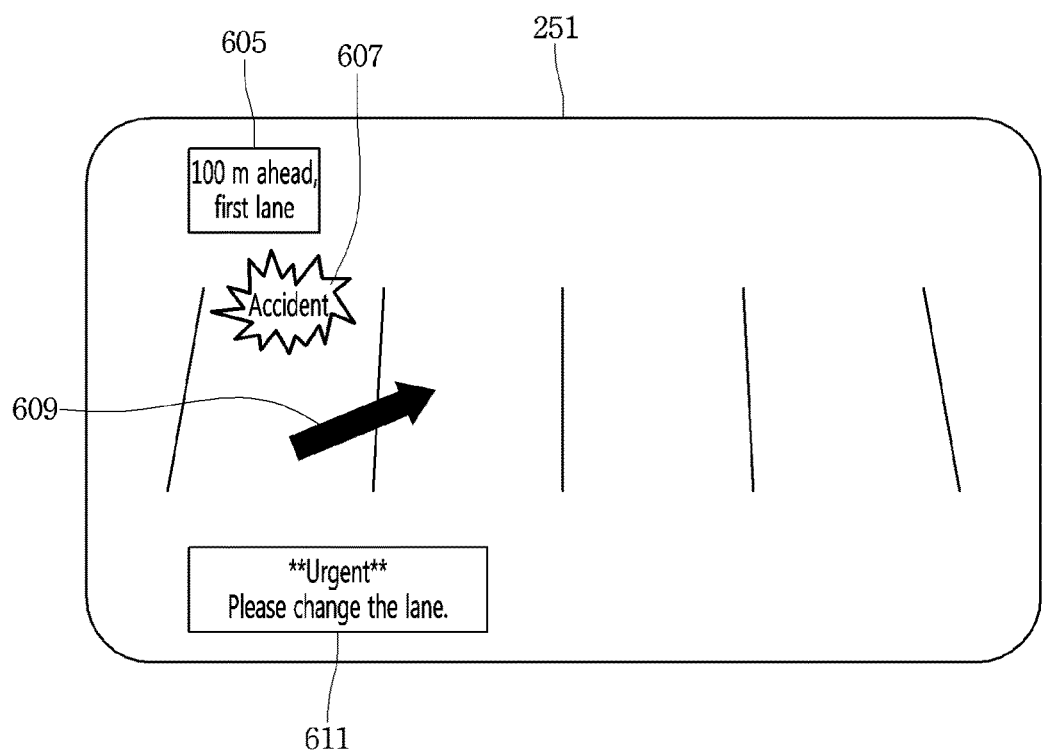

Next, FIG. 10 is described.

In addition to the information shown in FIG. 9, a lane change guide indicator 609 and a lane change message window 611 for guiding a lane change may be additionally displayed on the HUD 251 of the second vehicle 200B. The lane change guide indicator 609 may be an indicator for guiding the driver to change the lane to another safe lane as an accident occurs in the lane on which the second vehicle 200B is running or in an adjacent lane. The phrase "change the lane", which is output on the lane change message window 611, may also be output through the audio output unit 252.

Figure 11:
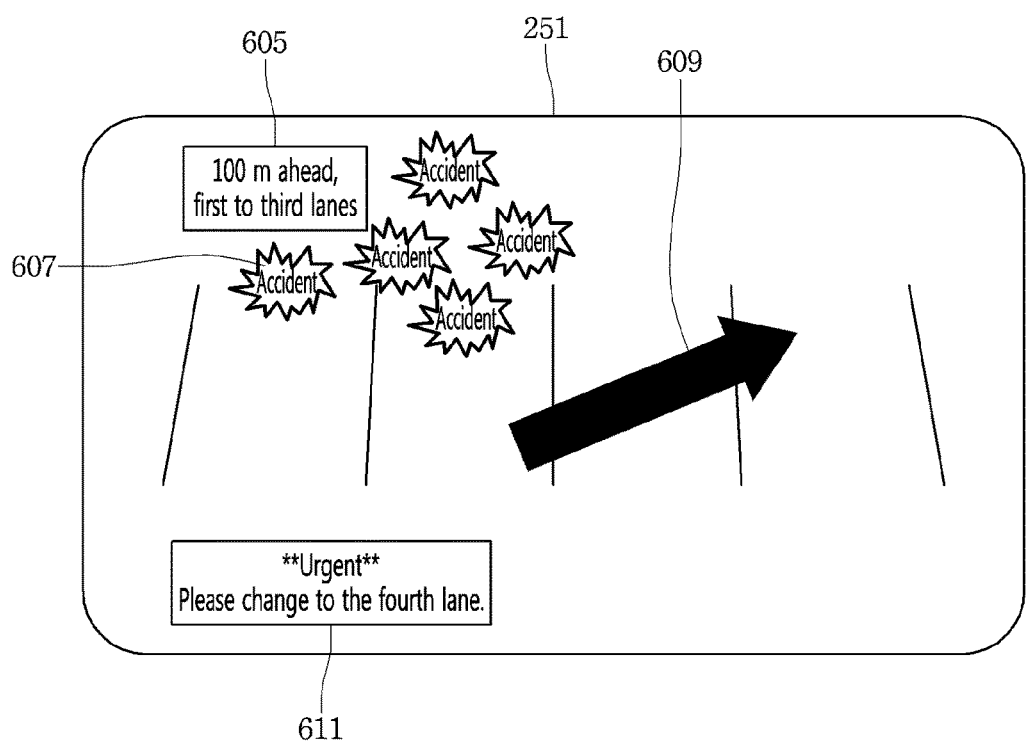

Next, FIG. 11 is described.

Referring to FIG. 11, the lane change guide indicator 609 may guide the driver of the second vehicle 200B from the accident occurrence spot to a lane having the lowest risk of additional accidents. The lane having the lowest risk of additional accidents may be output on the lane change message window 611.

Figure 12:
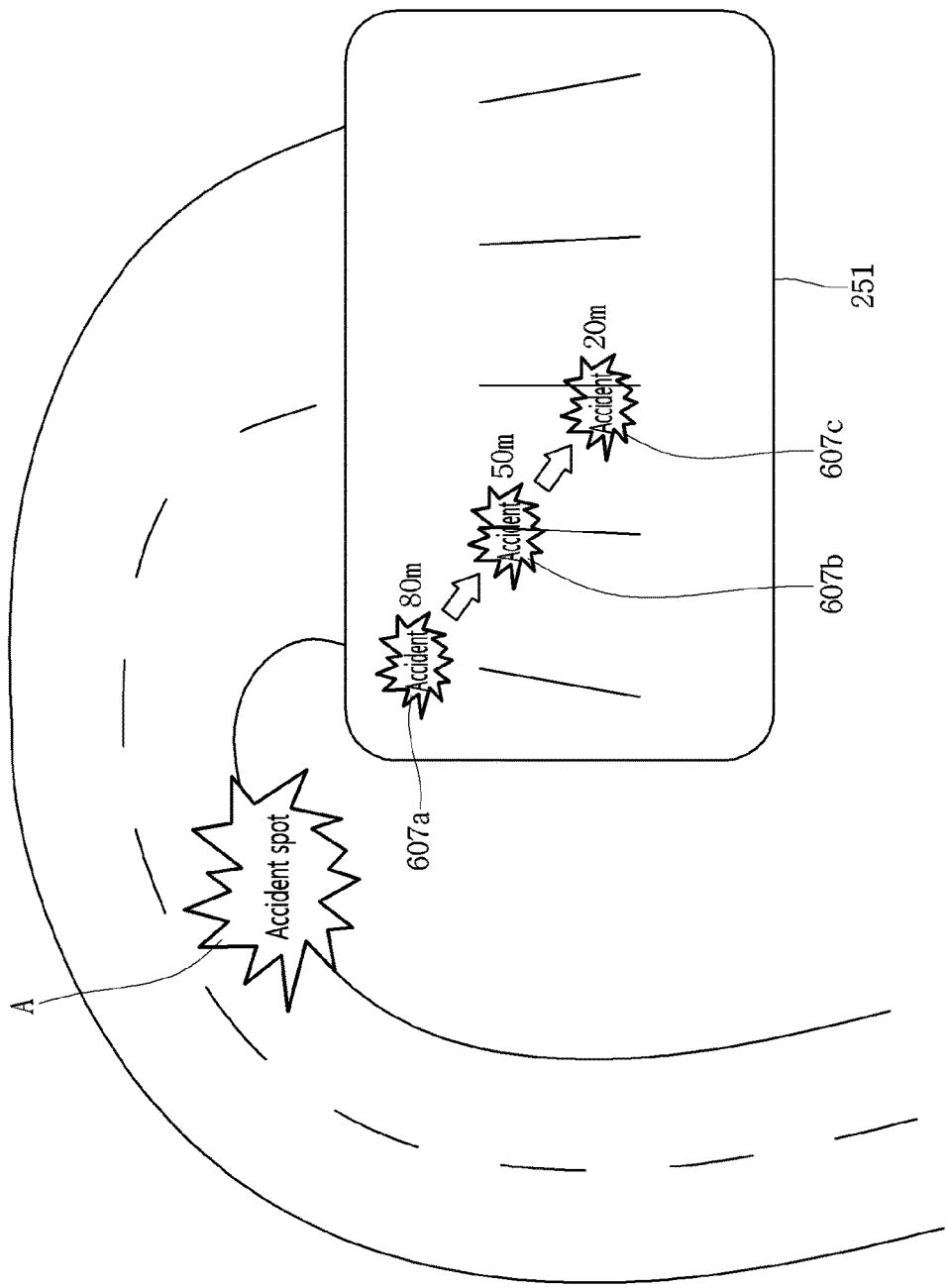

Next, FIG. 12 is described.

FIG. 12 illustrates a case where an accident occurs in the first vehicle 200A on a curved road. When an accident occurs on the curved road, the driver of the following second vehicle 200B cannot easily grasp the accident occurring ahead, as compared with the accident occurring on the straight road, due to the blind spot and the weather condition. To this end, the controller 280 of the second vehicle 200B may change the position of the accident occurrence indicator 607 displayed on the HUD 251, based on the position information of the first vehicle 200A and the position information of the second vehicle 200B included in the received emergency situation notification information. That is, as shown in FIG. 12, when the position of the second vehicle 200B approaches the accident spot A of the first vehicle 200A on the curved road, the controller 280 may control the HUD 251 to change the position of the accident occurrence indicator 607. That is, the controller 280 controls the HUD 251 to display the first accident occurrence indicator 607a when the second vehicle 200B is away from the accident spot A by 80 m, to display the second accident occurrence indicator 607b when the second vehicle 200B is approached to a position away from the accident spot A by 60 m, and to display the third accident occurrence indicator 607c when the second vehicle 200B is more approached to a position away from the accident spot A by 40 m.

Accordingly, the driver of the following vehicle has the effect of intuitively confirming that the vehicle is approaching to the accident spot even on the curved road.

Again, FIG. 5 is described.

The controller 280 of the second vehicle 200B controls the operation of the second vehicle 200B at the same time as or after the output of the emergency situation notification information (S211).

The second vehicle 200B may control at least one of the velocity of the second vehicle 200B and the tire air pressure of the tire, based on the emergency situation notification information received from the first vehicle 200A. Since the contents about the controlling of the operation of the second vehicle 2008 are the same as those about the controlling of the operation of the first vehicle 200A described in operation S205, the detailed descriptions thereof will be omitted.

The controller 280 of the second vehicle 200B transmits the emergency situation notification information received from the first vehicle 200A to the third vehicle 200C (S213).

In an embodiment, the controller 280 of the second vehicle 200B may control the short-range communication module 214 to transmit the emergency situation notification information to the short-range communication module 214 of the third vehicle 200C at the same time as the output of the received emergency situation notification information.

In an embodiment, the controller 280 of the second vehicle 200B may add additional information to the emergency situation notification information received from the first vehicle 200A and transmit the resultant information to the third vehicle 200C. The additional information may include information indicating whether an accident has occurred in the second vehicle 200B and location information of the second vehicle 200B.

The additional information may further include information generated by the radar module 216 of the second vehicle 200B. The information generated by the radar module 216 of the second vehicle 200B may include the distance between the first vehicle 200A and the second vehicle 200B and the velocity of the first vehicle 200A. Additionally, when a plurality of vehicles are located in front of the second vehicle 200B, the information generated by the radar module 216 of the second vehicle 200B may include the distance between the respective vehicles and the velocity of each vehicle through a plurality of beam processes.

Figure 13:
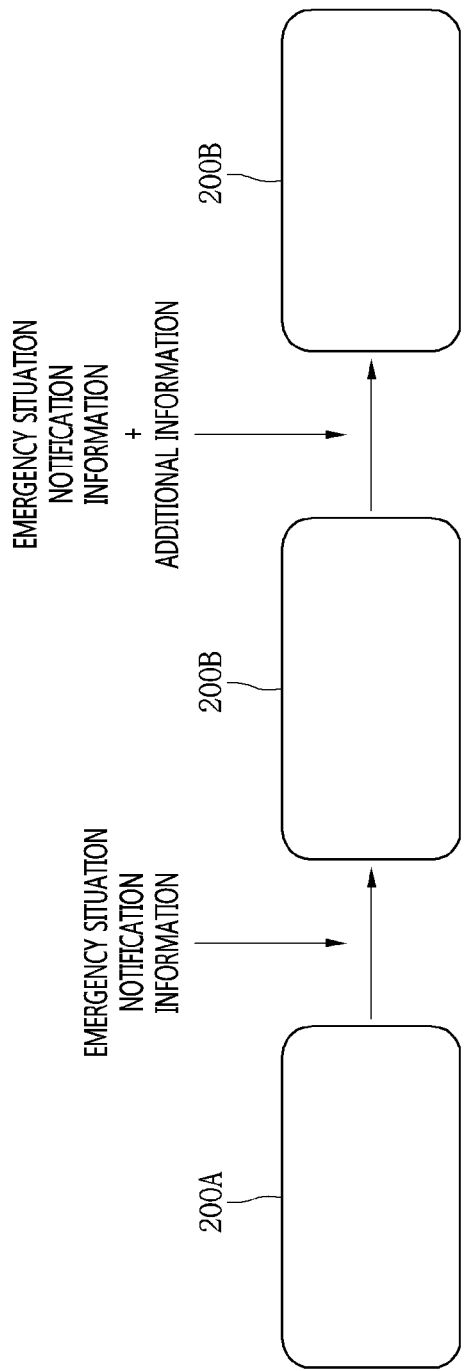

FIGS. 13 and 14 are views for explaining a process of allowing the second vehicle 200B to transmit emergency situation notification information and additional information to the following third vehicle and a data frame of the information according to an embodiment of the present invention.

Referring to FIG. 13, the second vehicle 200B following the first vehicle 200A may receive emergency situation notification information from the first vehicle 200A. The third vehicle 200C following the second vehicle 200B may receive the emergency situation notification information and the additional information from the second vehicle 200B.

FIG. 14 shows the data frame 600 indicating the emergency situation notification information and the additional information that the second vehicle 200B transmits to the third vehicle 200C.

The data frame 600 may include at least one of a transmission subject identifier field 610, an accident occurrence state field 620, a deteriorating weather condition field 630, a vehicle location field 640, a black box image field 650, and a vehicle operation control field 660.

The transmission subject identifier field 610 may be a field for identifying the subject of the vehicle that has transmitted the emergency situation notification information. When the transmission subject identifier field 610 is 1, it may indicate that the second vehicle 200B transmits the emergency situation notification information received from the first vehicle 200A to the third vehicle 200C.

The accident occurrence state field 620 may be a field indicating whether an accident occurrence state has been sensed. When the accident occurrence state field 620 has two values (0x, 0y), it may indicate that an accident has occurred in the first vehicle 200A that first transmitted the emergency situation notification information, and no accident has occurred in the second vehicle 200B.

The deteriorating weather condition field 630 may be a field including at least one of sensing or non-sensing of the deteriorating weather condition and weather information.

The vehicle location field 640 may be a field including at least one of the location information of the vehicle where the accident occurred and the location information of the vehicle that has transmitted the emergency situation notification information, when the accident occurrence state is detected.

The black box image field 650 may be a field including at least one of a black box image of a vehicle photographed at the time when the deteriorating weather condition is sensed or an accident occurred, and a black box image of the vehicle that has transmitted the emergency situation notification information.

The vehicle operation control field 660 may be a field including a command for controlling the operation of the vehicle as at least one of the deteriorating weather condition or the accident occurrence state is sensed. For example, if the state of the weather included in the deteriorating weather condition field 630 is the 10-m icy road, the vehicle operation control field 660 may include a command to decelerate the vehicle velocity to less than 40 km/h. In addition, the vehicle operation control field 660 may further include contents of the operation control of the vehicle described in operation S205.

In addition, the vehicle operation control field 560 may also include information for guiding the traveling direction of the vehicle (for example, lane change).

The driver of the third vehicle 200C can easily identify the accident occurrence state and the deteriorating weather condition of the vehicle located ahead through the data frame 600 and cope with the accident occurrence state and the deteriorating weather condition.

Next, FIGS. 15 to 18 are described.

FIGS. 15 to 18 are views for explaining an example in which the emergency situation notification information is transmitted or received according to whether communication standard for vehicle-to-vehicle information transmission is supplied.

Hereinafter, it is assumed that the first vehicle 200A and the first mobile terminal 100A disposed inside the first vehicle 200A can perform short-range wireless communication with each other, and the second vehicle 200B and the second mobile terminal 100B disposed inside the second vehicle 200B can perform short-range wireless communication with each other, and the first mobile terminal 100A and the second mobile terminal 100B can perform wireless communication with each other.

Figure 15:
FIGS. 15 to 18 are views for explaining an example in which the emergency situation notification information is transmitted or received according to whether communication standard for vehicle-to-vehicle information transmission is supported.

First, FIG. 15 shows an embodiment in which the radar module 216 capable of supporting V2V communication is mounted on each of the first vehicle 200A and the second vehicle 200B. Referring to FIG. 15, the first vehicle 200A can transmit emergency situation notification information to another vehicle, and the second vehicle 200B can also receive emergency situation notification information from another vehicle. In this case, the first vehicle 200A can directly transmit the emergency situation notification information to the second vehicle 200B without passing through the mobile terminal.

Figure 16:
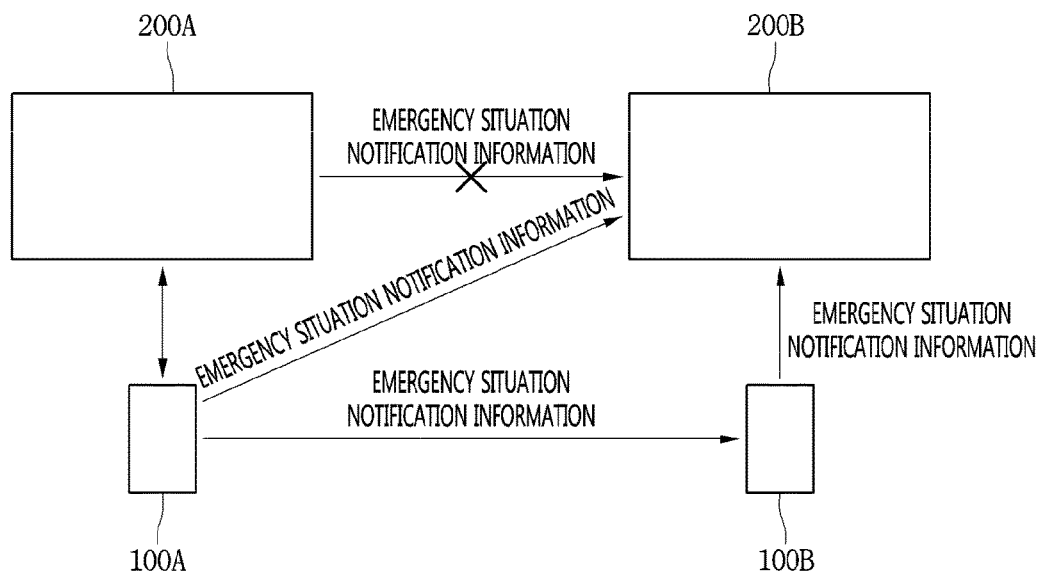

Next, FIG. 16 is described.

FIG. 16 shows an embodiment in which the first vehicle 200A cannot perform V2V communication and the second vehicle 200B can perform V2V communication. Referring to FIG. 16, the first vehicle 200A cannot transmit the emergency situation notification information directly to the second vehicle 200B because the radar module 216 supporting the V2V communication is not mounted. The first vehicle 200A can transmit the emergency situation notification information to the first mobile terminal 100A disposed inside the first vehicle 200A. The first mobile terminal 100A can transmit the received emergency situation notification information to the second mobile terminal 200B or the second mobile terminal 200B disposed inside the second vehicle 200B.

Figure 17:
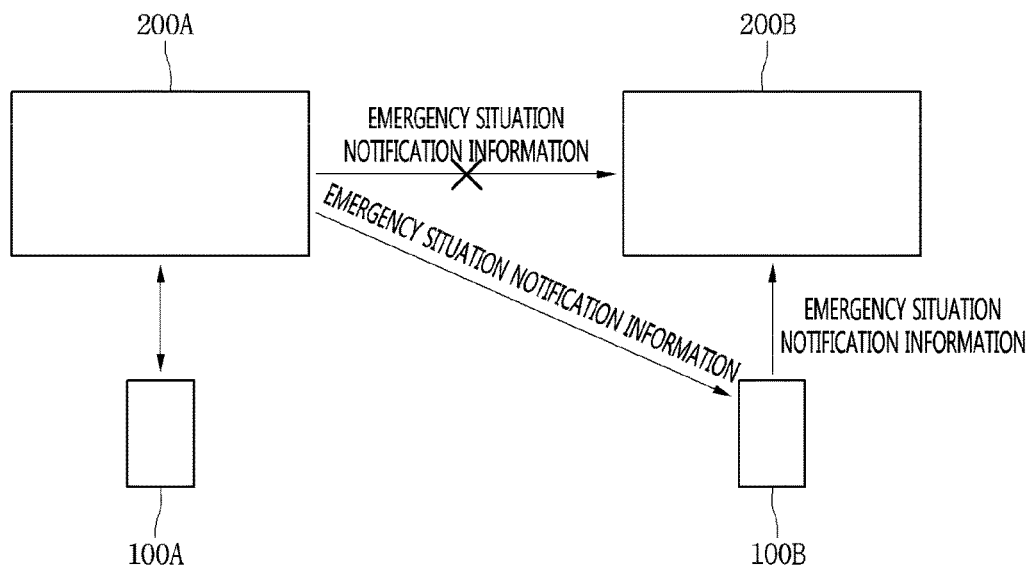

Next, FIG. 17 is described.

FIG. 17 shows an embodiment in which the first vehicle 200A can perform V2V communication and the second vehicle 200B cannot perform V2V communication. Referring to FIG. 17, the second vehicle 200B cannot receive the emergency situation notification information directly from the first vehicle 200A because the radar module 216 supporting the V2V communication is not mounted. The first vehicle 200A can transmit the emergency situation notification information to the second mobile terminal 100B disposed inside the second vehicle 200B. The second mobile terminal 100B can transmit the received emergency situation notification information to the paired second vehicle 200B.

Figure 18:
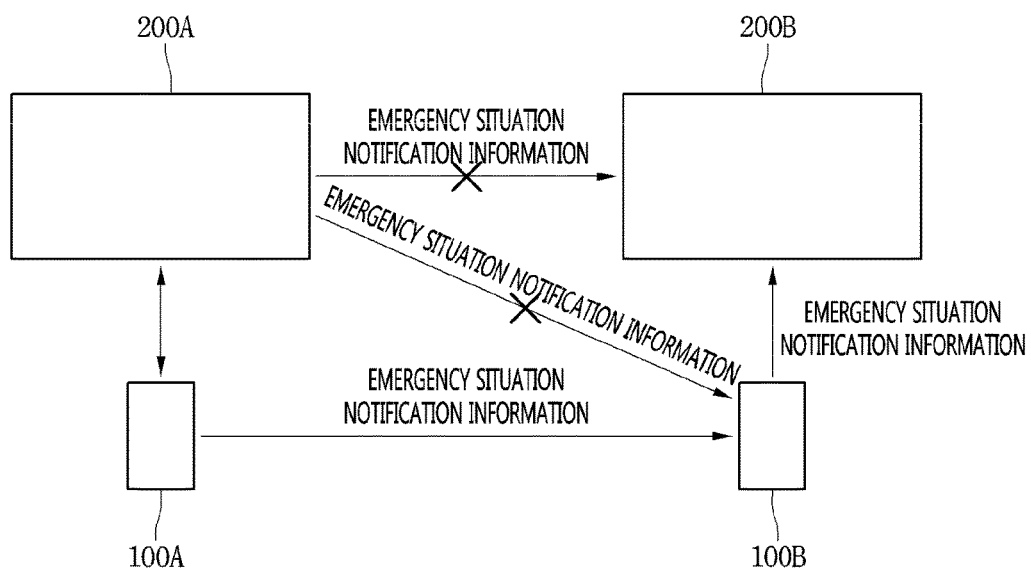

Next, FIG. 18 is described.

FIG. 18 shows an embodiment in which both the first vehicle 200A and the second vehicle 200B cannot perform V2V communication. Referring to FIG. 18, the first vehicle 200A and the second vehicle 200B cannot directly transmit or receive the emergency situation notification information because the radar module 216 supporting the V2V communication is not mounted. The first vehicle 200A can transmit the emergency situation notification information to the first mobile terminal 100A, and the first mobile terminal 100A can transmit the received emergency situation notification information to the second mobile terminal 100B. The second mobile terminal 100B can transmit the received emergency situation notification information to the second vehicle 200B.

The above-described present invention may also be embodied as computer-readable codes on a program-recorded medium. The computer-readable recording medium may be any recording medium that can store data which can be thereafter read by a computer system. Examples of computer-readable recording mediums include HDD (Hard Disk Drive), SSD (Solid State Disk), SDD (Silicon Disk Drive), ROM, RAM, CD-ROM, a magnetic tape, a floppy disk, an optical data storage device, and the like. If desired, the computer-readable recording medium may be realized in the form of a carrier wave (for example, a transmission over the Internet). The computer may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A vehicle comprising:
   a radar module configured to receive emergency situation notification information indicating a deteriorating weather condition and an accident occurrence state from a front vehicle positioned ahead;
   an output unit configured to output the received emergency situation notification information; and
   a controller configured to:
   control the radar module to transmit the emergency situation notification information including additional information, which is obtained through the radar module, to a rear vehicle positioned behind,
   increase an intensity of a transmission signal including the emergency situation notification information if a distance between the vehicle and the rear vehicle is longer than a reference distance, and
   reduce the intensity of the transmission signal, if the distance is less than the reference distance,
   wherein a data frame constituting the emergency situation notification information comprises a black box image field indicating a black box image at the time when at least one of the deteriorating weather condition or the accident occurrence state is sensed, and a vehicle operation control field including a command for controlling a velocity of the vehicle as at least one of the deteriorating weather condition or the accident occurrence state is detected.

2. The vehicle according to claim 1, wherein the controller controls at least one of a velocity of the vehicle and an air pressure of a tire of the vehicle, based on the received emergency situation notification information.

3. The vehicle according to claim 1, wherein the data frame constituting the emergency situation notification information further comprises at least one of a transmission subject identifier field for identifying a subject of a vehicle that transmitted the emergency situation notification information, an accident occurrence state field indicating whether an accident occurrence state has been sensed, a deteriorating weather condition field including at least one of sensing or non-sensing of a deteriorating weather condition and weather information and a vehicle location field including location information of the vehicle where the accident occurred.

4. The vehicle according to claim 1, wherein the output unit comprises a head up display (HUD) provided on a front windshield of the vehicle to display the emergency situation notification information through a transparent film, and
   wherein the controller controls the HUD to display at least one of a message for guiding a lane change, a distance from the vehicle to an accident occurrence spot, an accident occurrence indicator indicating an accident occurrence spot, and a lane of an accident occurrence spot, based on the emergency situation notification information.

5. The vehicle according to claim 4, wherein the controller controls the HUD to change the position of the accident occurrence indicator based on the location information of the front vehicle and own location information included in the emergency situation notification information.

6. The vehicle according to claim 1, wherein the additional information comprises at least one of whether an accident has occurred in the vehicle, a distance between the front vehicle and the vehicle, which is obtained through the radar module, and a velocity of the front vehicle.

7. A vehicle comprising:
   a radar module configured to transmit emergency situation notification information to a rear vehicle when at least one of a deteriorating weather condition and an accident occurrence state is sensed;
   an output unit configured to output the emergency situation notification information; and
   a controller configured to:
   obtain traffic-related information, sense the deteriorating weather condition or the accident occurrence state based on the obtained traffic-related information, and control the operation of the vehicle according to the sensing result,
   increase an intensity of a transmission signal including the emergency situation notification information if a distance between the vehicle and the rear vehicle is longer than a reference distance, and
   reduce the intensity of the transmission signal, if the distance is less than the reference distance,
   wherein a data frame constituting the emergency situation notification information comprises a black box image field indicating a black box image at the time when at least one of the deteriorating weather condition or the accident occurrence state is sensed, and a vehicle operation control field including a command for controlling a velocity of the vehicle as at least one of the deteriorating weather condition or the accident occurrence state is detected.

8. The vehicle according to claim 7, wherein the traffic-related information comprises at least one of weather information at a position where a vehicle is located, black box image information obtained through a camera provided in the vehicle, vehicle information of the vehicle, and road condition information of a road on which the vehicle is running, and
   wherein the vehicle information comprises at least one of an amount of impact applied to the vehicle, an acceleration of the vehicle, a velocity of the vehicle, location information of the vehicle, and a distance between the vehicle and a front vehicle.

9. The vehicle according to claim 8, wherein the controller controls at least one of a velocity of the vehicle and an air pressure of a tire of the vehicle when at least one of the deteriorating weather condition and the accident occurrence state is sensed.

10. The vehicle according to claim 7, wherein the output unit comprises a head up display (HUD) provided on a front windshield of the vehicle to display the emergency situation notification information through a transparent film, and
    wherein the controller controls the HUD to display at least one of a message for guiding a lane change, a distance from the vehicle to an accident occurrence spot, an accident occurrence indicator indicating an accident occurrence spot, and a lane of an accident occurrence spot, based on the emergency situation notification information.

11. The vehicle according to claim 10, wherein the controller controls the HUD to change the position of the accident occurrence indicator based on the location information of the front vehicle and own location information included in the emergency situation notification information.

12. The vehicle according to claim 7, wherein the data frame constituting the emergency situation notification information further comprises at least one of a transmission subject identifier field for identifying a subject of a vehicle that transmitted the emergency situation notification information, an accident occurrence state field indicating whether an accident occurrence state has been sensed, a deteriorating weather condition field including at least one of sensing or non-sensing of a deteriorating weather condition and weather information and a vehicle location field including location information of the vehicle where the accident occurred.

13. A mobile terminal comprising:
a wireless communication unit configured to receive traffic-related information from a vehicle;
an output unit configured to output emergency situation notification information generated when at least one of a deteriorating weather condition and an accident occurrence state is sensed, based on the received traffic-related information; and
a controller configured to:
control the wireless communication unit such that, when the mobile terminal is disposed inside the vehicle, a power mode of a short-range communication module provided in the mobile terminal is changed from a low power mode to a general power mode, and the emergency situation notification information is transmitted to a mobile terminal disposed inside a rear vehicle,
increase an intensity of a transmission signal including the emergency situation notification information if a distance between the vehicle and the rear vehicle is longer than a reference distance, and
reduce the intensity of the transmission signal, if the distance is less than the reference distance,
wherein a data frame constituting the emergency situation notification information comprises a black box image field indicating a black box image at the time when at least one of the deteriorating weather condition or the accident occurrence state is sensed, and a vehicle operation control field including a command for controlling a velocity of the vehicle as at least one of the deteriorating weather condition or the accident occurrence state is detected.

14. The mobile terminal according to claim 13, wherein the controller controls the wireless communication unit to amplify the intensity of power used when the emergency situation notification information is transmitted in the general power mode and transmit the power to the mobile terminal disposed inside the rear vehicle.

* * * * *